(12) United States Patent
Harel et al.

(10) Patent No.: US 10,136,427 B2
(45) Date of Patent: Nov. 20, 2018

(54) PARTITIONING A TIME-DIVISION-BASED COMMUNICATIONS LINK FOR COMMUNICATING MULTIPLE TYPES OF COMMUNICATIONS SIGNALS IN A WIRELESS DISTRIBUTION SYSTEM (WDS)

(71) Applicant: Corning Optical Communications Wireless Ltd, Airport City (IL)

(72) Inventors: Dror Harel, Hod Hasharon (IL); Gavriel Mizrahi, Tel Aviv (IL); Ofer Nisan, Netanya (IL)

(73) Assignee: Corning Optical Communications Wireless Ltd, Airport City (IL)

( * ) Notice: Subject to any disclaimer, the term of this patent is extended or adjusted under 35 U.S.C. 154(b) by 138 days.

(21) Appl. No.: 15/230,949

(22) Filed: Aug. 8, 2016

(65) Prior Publication Data

US 2018/0042010 A1 Feb. 8, 2018

(51) Int. Cl.
*H04W 4/00* (2018.01)
*H04W 72/04* (2009.01)
(Continued)

(52) U.S. Cl.
CPC ...... *H04W 72/0446* (2013.01); *H04B 7/0413* (2013.01); *H04W 88/085* (2013.01);
(Continued)

(58) Field of Classification Search
None
See application file for complete search history.

(56) References Cited

U.S. PATENT DOCUMENTS 6,331,986 B1 12/2001 Mitra et al.
7,362,975 B2 4/2008 Choi et al.
(Continued)

FOREIGN PATENT DOCUMENTS

CN 201869169 U 6/2011
JP H0969852 3/1997
(Continued)

OTHER PUBLICATIONS

International Search Report and Written Opinion PCT/IL2017/050874 dated Nov. 15, 2017.
(Continued)

*Primary Examiner* — Anh Vu H Ly
(74) *Attorney, Agent, or Firm* — C. Keith Montgomery

(57) ABSTRACT

Embodiments of the disclosure relate to partitioning a time-division-based communications link for communicating multiple types of communications signals in a wireless distribution system (WDS). A WDS is configured to communicate multiple types of communications signals over a time-division-based communications link. For example, the WDS may be configured to communicate a digital baseband signal as a first type of communications signal and an Ethernet signal as a second type of communications signal. In this regard, a protocols division routing circuit(s) is provided in the WDS and configured to partition the time-division-based communications link between multiple types of communications signals based on a link configuration ratio. By partitioning the time-division-based communications link based on the link configuration ratio, it is possible to partition the time-division-based communications link according to actual capacity needs of the multiple types of communications signals, thus optimizing throughput and performance of the WDS.

38 Claims, 12 Drawing Sheets

(51) Int. Cl.
  *H04B 7/0413* (2017.01)
  *H04W 88/08* (2009.01)
  *H04B 10/00* (2013.01)
  *H04Q 11/00* (2006.01)
  *H04W 88/10* (2009.01)
  *H04L 12/24* (2006.01)

(52) U.S. Cl.
  CPC .............. *H04B 10/00* (2013.01); *H04L 41/00* (2013.01); *H04Q 11/00* (2013.01); *H04W 88/10* (2013.01)

(56) References Cited

U.S. PATENT DOCUMENTS

| | | | |
|---|---|---|---|
| 7,885,186 B2 | 2/2011 | MacLean et al. | |
| 7,912,087 B2 | 3/2011 | Tsukishima et al. | |
| 8,165,100 B2 | 4/2012 | Sabat et al. | |
| 9,179,321 B2 | 11/2015 | Hasarchi et al. | |
| 9,621,293 B2* | 4/2017 | Hazani | H04J 3/1694 370/328 |
| 2002/0097716 A1* | 7/2002 | Kumaran | H04L 47/10 370/389 |
| 2009/0316611 A1 | 12/2009 | Stratford et al. | |
| 2011/0182217 A1 | 7/2011 | Schmid et al. | |
| 2012/0324100 A1 | 12/2012 | Tomici et al. | |
| 2013/0107763 A1 | 5/2013 | Uyehara et al. | |
| 2014/0162664 A1 | 6/2014 | Stapleton et al. | |
| 2014/0269318 A1 | 9/2014 | Hasarchi et al. | |
| 2015/0256358 A1 | 9/2015 | Stapleton et al. | |
| 2015/0358963 A1* | 12/2015 | Sawai | H04W 72/1231 370/336 |
| 2016/0234819 A1* | 8/2016 | da Silva | H04L 41/5054 370/328 |
| 2017/0288716 A1* | 10/2017 | Daniel | H04B 1/12 370/328 |
| 2017/0318561 A1* | 11/2017 | Harel | H04W 72/04 370/328 |
| 2017/0347287 A1* | 11/2017 | Radin | H04W 28/0231 370/328 |
| 2017/0347305 A1* | 11/2017 | Abraha | H04W 40/02 370/328 |
| 2017/0347351 A1* | 11/2017 | Cai | H04L 47/29 370/328 |

FOREIGN PATENT DOCUMENTS

| | | |
|---|---|---|
| WO | 2008076248 A1 | 6/2008 |
| WO | 2009012614 A1 | 1/2009 |
| WO | 2012151650 A1 | 11/2012 |
| WO | 2014024192 A1 | 2/2014 |
| WO | 2014082070 A1 | 5/2014 |
| WO | 2014133892 A1 | 9/2014 |
| WO | 2015094197 A1 | 6/2015 |

OTHER PUBLICATIONS

Patent Cooperation Treaty, International Search Report for PCT/IL2014/050758, dated Nov. 19, 2014, 4 pages.
International Preliminary Report on Patentability for PCT/IL2014/050758, dated Mar. 10, 2016, 8 pages.

* cited by examiner

| TIME-DIVISION BASED COMMUNICATIONS LINK IDENTIFIER | FREQUENCY CHANNELS OCCUPIED BY THE FIRST TYPE COMMUNICATIONS SIGNAL (204) | PREDEFINED LINK CONFIGURATION POLICY |
|---|---|---|
| LINK 1 (e.g., TIME-DIVISION BASED COMMUNICATIONS LINK 202(N)) | 642, 435, 455, 342, 550 | 1. ALLOW THE SECOND TYPE COMMUNICATIONS SIGNAL (206) TO OCCUPY UP TO 4 Gbps CAPACITY OF LINK 1<br>2. ELIMINATE CHANNEL 642 IF NEEDED<br>3. ELIMINATE CHANNEL 455 IF FURTHER NEEDED |
| LINK 2 | 642, 435, 442, 485 | 1. ALLOW THE SECOND TYPE COMMUNICATIONS SIGNAL (206) TO OCCUPY UP TO 4 Gbps CAPACITY OF LINK 2<br>2. OMIT ONE OF THE MIMO STREAMS ASSOCIATED WITH CHANNEL 442 IF NEEDED<br>3. OMIT ONE OF THE MIMO STREAMS ASSOCIATED WITH CHANNEL 485 IF FURTHER NEEDED |
| LINK 3 | 642, 435, 440, 480 | 1. ALLOW THE SECOND TYPE COMMUNICATIONS SIGNAL (206) TO OCCUPY UP TO 4 Gbps CAPACITY OF LINK 3<br>2. ACTIVATE COMPRESSION ALGORITHM ON THE FIRST TYPE COMMUNICATIONS SIGNAL (204) ON CHANNELS 440 AND 480 IF NEEDED |
| ... | | |
| LINK M | 642, 435, 455, 410, 415 | 1. ALLOW THE SECOND TYPE COMMUNICATIONS SIGNAL (206) TO OCCUPY UP TO 2 Gbps CAPACITY OF LINK M<br>2. REDUCE THE NUMBER OF BITS USED FOR THE FIRST TYPE COMMUNICATIONS SIGNAL (204) (e.g., FROM 14 BITS TO 10 BITS) IF NEEDED<br>3. ELIMINATE CHANNEL 410 IF FURTHER NEEDED |

FIG. 5

PARTITIONING A TIME-DIVISION-BASED COMMUNICATIONS LINK FOR COMMUNICATING MULTIPLE TYPES OF COMMUNICATIONS SIGNALS IN A WIRELESS DISTRIBUTION SYSTEM (WDS)

BACKGROUND

The disclosure relates generally to a wireless distribution system (WDS), and more particularly to techniques for partitioning time-division-based communications links within the WDS.

Wireless customers are increasingly demanding digital data services, such as streaming video signals. At the same time, some wireless customers use their wireless communication devices in areas that are poorly serviced by conventional cellular networks, such as inside certain buildings or areas where there is little cellular coverage. One response to the intersection of these two concerns has been the use of WDS. WDS include remote units configured to receive and transmit communications signals to client devices within the antenna range of the remote units. WDSs can be particularly useful when deployed inside buildings or other indoor environments where the wireless communication devices may not otherwise be able to effectively receive radio frequency (RF) signals from a source.

In this regard, FIG. 1 illustrates distribution of communications services to remote coverage areas 100(1)-100(N) of a WDS 102, wherein 'N' is the number of remote coverage areas. These communications services can include cellular services, wireless services, such as RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a head-end equipment (HEE) 106 (e.g., a head-end controller, a head-end unit, or a central unit). The HEE 106 may be communicatively coupled to a first signal source 108, for example, a base transceiver station (BTS) and/or a baseband unit (BBU).

In this regard, the HEE 106 receives first downlink communications signals 110D from the first signal source 108 to be distributed to the remote units 104(1)-104(N). The remote units 104(1)-104(N) are configured to receive the first downlink communications signals 110D from the HEE 106 over a communications medium 112 to be distributed to the respective remote coverage areas 100(1)-100(N) of the remote units 104(1)-104(N). In a non-limiting example, the communications medium 112 is a wired communications medium, a wireless communications medium, or an optical fiber-based communications medium. Each of the remote units 104(1)-104(N) may include an RF transmitter/receiver (not shown) and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive first uplink communications signals 110U from the client devices 116 in the respective remote coverage areas 100(1)-100(N) to be distributed to the first signal source 108. The size of each of the remote coverage areas 100(1)-100(N) is determined by amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

With continuing reference to FIG. 1, the HEE 106 may be further coupled to a second signal source 118, for example, an Ethernet hub. In this regard, the HEE 106 receives second downlink communications signals 120D from the second signal source 118 to be distributed to the remote units 104(1)-104(N). The remote units 104(1)-104(N) are also be configured to distribute second uplink communications signals 120U to the second signal source 118. In this regard, the communications medium 112 is configured to communicate the first downlink communications signals 110D, the first uplink communications signals 110U, the second downlink communications signals 120D, and the second uplink communications signals 120U based on a time-division scheme. As such, it may be desired that the overall capacity (e.g., bandwidth) of the communications medium 112 needs to be properly divided to optimize overall performance of the WDS 102. Although communication protocols, such as the common public radio interface (CPRI) protocol, can be configured to partition the communications medium 112 between the first downlink communications signals 110D and the second downlink communications signals 120D, it is only possible to allocate certain capacity (e.g., up to three hundred megabits per second (300 Mbps)) to the second downlink communications signals 120D.

With continuing reference to FIG. 1, the overall capacity of the communications medium 112 needs to be properly divided between the first downlink communications signals 110D and the second downlink communications signals 120D to optimize overall performance of the WDS 102. For example, if the overall capacity of the communications medium 112 is ten gigabits per second (10 Gbps), it may be possible to allocate seven gigabits per second (7 Gbps) capacity to the first downlink communications signals 110D, two point nine gigabits per second (2.9 Gbps) capacity to the second downlink communications signals 120D, and the remaining zero point one gigabits per second (0.1 Gbps) capacity to other type of communications signals (e.g., management and control signals). It is also desirable to divide the overall capacity of the communications medium 112 based on actual characteristics (e.g., traffic volume) of the first downlink communications signals 110D, the second downlink communications signals 120D, the first uplink communications signals 110U, and the second uplink communications signals 120U, thus maximizing the overall performance of the WDS 102.

No admission is made that any reference cited herein constitutes prior art. Applicant expressly reserves the right to challenge the accuracy and pertinency of any cited documents.

SUMMARY

Embodiments of the disclosure relate to partitioning a time-division-based communications link for communicating multiple types of communications signals (i.e., types of data) in a wireless distribution system (WDS). A WDS is configured to communicate multiple types of communications signals over a time-division-based communications link. For example, the WDS may be configured to communicate a digital baseband signal as a first type of communications signal, and an Ethernet signal as a second type of communications signal, both over the time-division-based communications link. As such, the time-division-based communications link may be partitioned between the multiple types of communications signals, because the bandwidth capacity of the WDS may be limited beyond the individual bandwidth needs of each type of communications signals. In this regard, a protocols division routing circuit(s) is provided in the WDS. The protocols division routing circuit(s) is configured to partition a time-division-based communications link in the WDS between multiple types of communications signals based on a link configuration ratio. The link configuration ratio indicates the ratio of time that the time-division-based communications link is to be partitioned between the multiple types of communications signals. In a non-limiting example, the link configuration ratio is determined by sensing actual characteristics of one or more of the multiple types of communications signals. By partitioning the time-division-based communications link based on the link configuration ratio, it is possible to partition the time-division-based communications link according to actual capacity needs of the multiple types of communications signals, thus optimizing throughput and performance of the WDS.

One embodiment of the disclosure relates to a WDS. The WDS comprises a plurality of remote units, wherein at least one remote unit among the plurality of remote units comprises a remote cluster. The WDS also comprises a central digital routing unit (DRU) communicatively coupled to the plurality of remote units over a plurality of communications links. The central DRU is communicatively coupled to the remote cluster by a time-division-based communications link among the plurality of communications links. The central DRU is configured to communicate a first type communications signal with a first signal source. The central unit is also configured to communicate a second type communications signal with a second signal source. The WDS also comprises at least one central protocols division routing circuit (PDRC). The central PDRC is communicatively coupled to the central DRU and the time-division-based communications link. The central PDRC is configured to communicate the first type communications signal and the second type communications signal at different times over the time-division-based communications link with the remote cluster based on a link configuration ratio.

Another embodiment of the disclosure relates to a method for partitioning a time-division-based communications link in a WDS comprising a plurality of remote units. The method comprises communicating a first type communications signal with a first signal source. The method also comprises communicating a second type communications signal with a second signal source. The method also comprises communicating the first type communications signal and the second type communications signal at different times over the time-division-based communications link based on a link configuration ratio.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 5 is a table providing exemplary predefined link configuration policies that can be used to determine the link configuration ratio for a time-division-based communications link in the WDS in FIG. 2;

2 configured to enable partitioning of the time-division-based communications link based on the link configuration ratio can be provided.

DETAILED DESCRIPTION

Embodiments of the disclosure relate to partitioning a time-division-based communications link for communicating multiple types of communications signals (i.e., types of data) in a wireless distribution system (WDS). A WDS is configured to communicate multiple types of communications signals over a time-division-based communications link. For example, the WDS may be configured to communicate a digital baseband signal as a first type of communications signal, and an Ethernet signal as a second type of communications signal, both over the time-division-based communications link. As such, the time-division-based communications link may be partitioned between the multiple types of communications signals, because the bandwidth capacity of the WDS may be limited beyond the individual bandwidth needs of each type of communications signals. In this regard, a protocols division routing circuit(s) is provided in the WDS. The protocols division routing circuit(s) is configured to partition a time-division-based communications link in the WDS between multiple types of communications signals based on a link configuration ratio. The link configuration ratio indicates the ratio of time that the time-division-based communications link is to be partitioned between the multiple types of communications signals. In a non-limiting example, the link configuration ratio is determined by sensing actual characteristics of one or more of the multiple types of communications signals. By partitioning the time-division-based communications link based on the link configuration ratio, it is possible to partition the time-division-based communications link according to actual capacity needs of the multiple types of communications signals, thus optimizing throughput and performance of the WDS.

Figure 1:
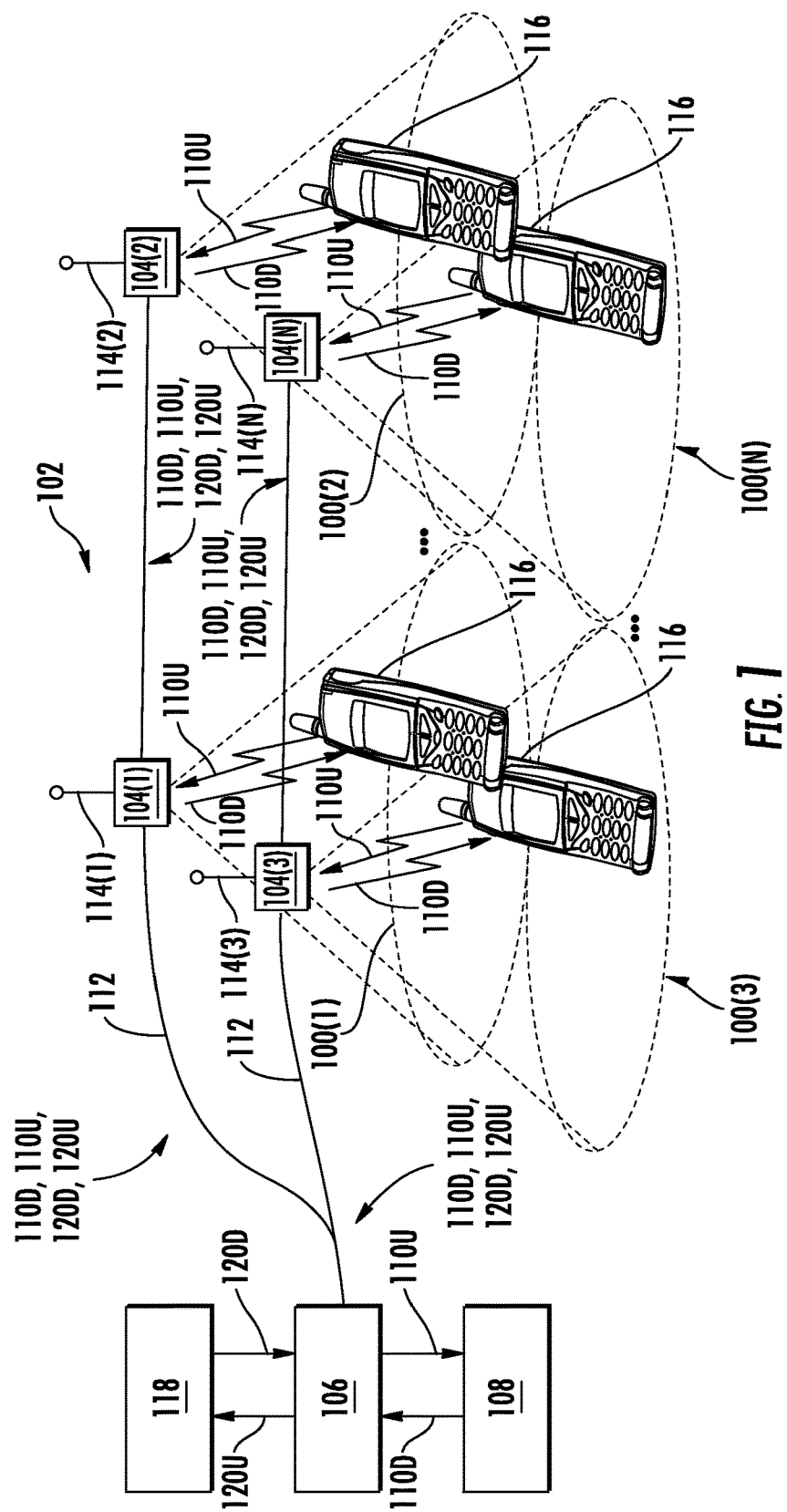
FIG. 1 illustrates distribution of communications services to remote coverage areas of a wireless distribution system (WDS)
Figure 2:
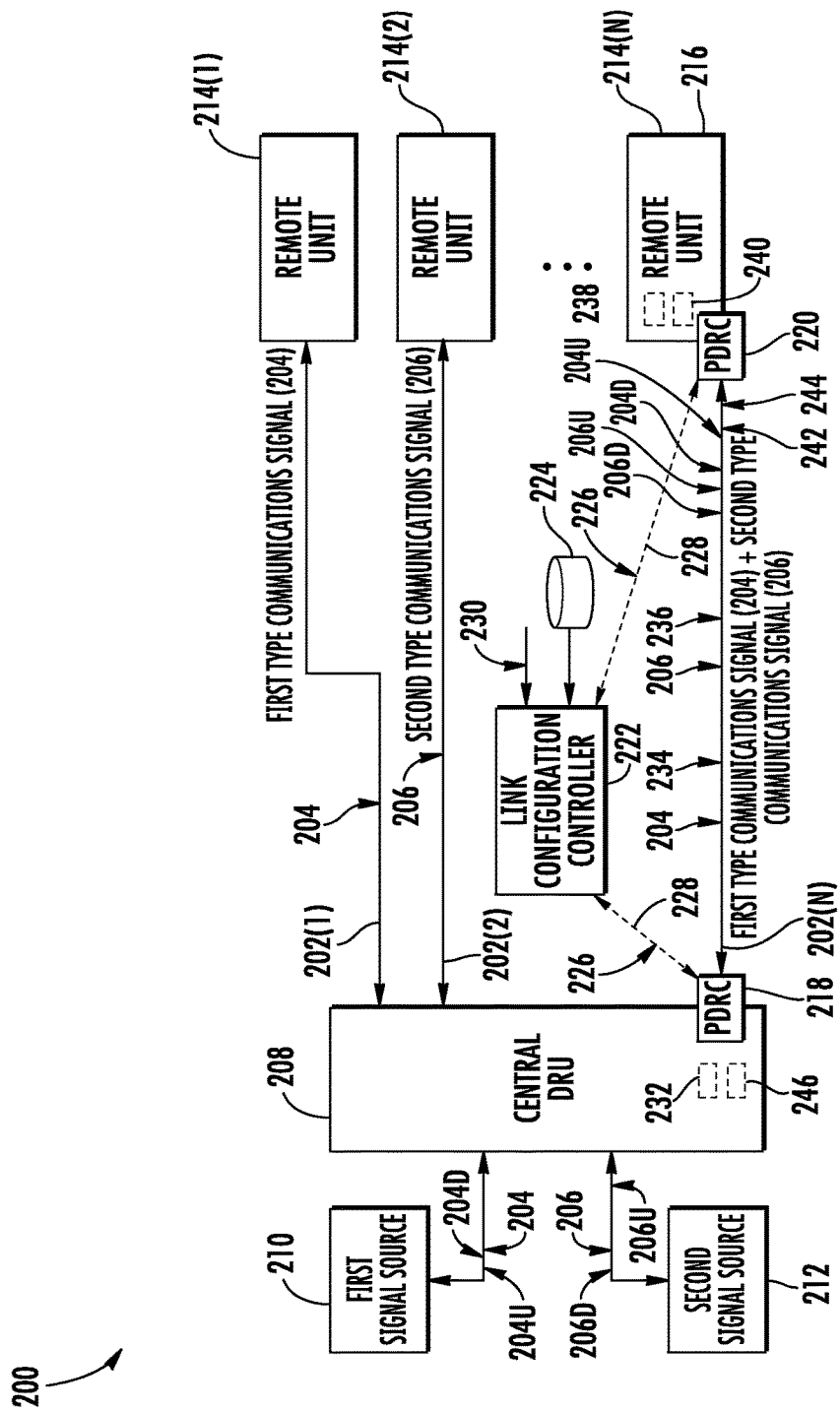
FIG. 2 is a schematic diagram of an exemplary WDS in which at least one time-division-based communications link among a plurality of time-division-based communications links is partitioned based on a link configuration ratio to communicate different, multiple types of communications signals.

In this regard, FIG. 2 is a schematic diagram of an exemplary WDS 200 that includes a plurality of time-division-based communications links 202(1)-202(N). As will be discussed by example in more detail below, at least one time-division-based communications link 202(N) among the time-division-based communications links 202(1)-202(N) is partitioned based on a link configuration ratio ($R_L$) to communicate a first type communications signal 204 and a second type communications signal 206. It shall be noted that the first type communications signal 204 and the second type communications signal 206 are merely non-limiting examples and shall not be interpreted as being limiting. It is possible to partition the time-division-based communications link 202(N) to communicate multiple types of communications signals. For example, the time-division-based communications link 202(N) may also be configured to support control/management type communications signals (not shown) in addition to the first type communications signal 204 and the second type communications signal 206.

Figure 3:
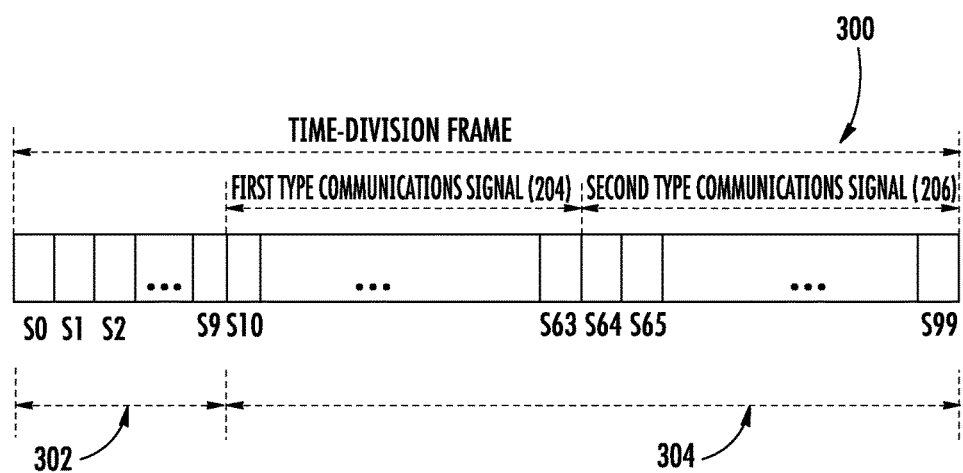
FIG. 3 is a schematic diagram of an exemplary time-division frame configured to enable partitioning of the at least one time-division-based communications link of FIG. 2 based on the link configuration ratio.

To further illustrate an example of partitioning the time-division-based communications link 202(N) based on the link configuration ratio ($R_L$), FIG. 3 is discussed next. In this regard, FIG. 3 is a schematic diagram of an exemplary time-division frame 300 configured to partition the time-division-based communications link 202(N) of FIG. 2 according to the link configuration ratio ($R_L$).

With reference to FIG. 3, in a non-limiting example, the time-division frame 300 includes one hundred (100) time slots labeled S0-S99, respectively. It shall be appreciated that the time-division frame 300 can include any integer number of time slots as deemed appropriate. Each of the one hundred (100) time slots is configured to convey one or more encoded information bits (e.g., binary bits) (not shown). The time-division frame 300 includes a header portion 302, which occupies the time slots S0-S9, configured to carry information related to the time-division frame 300 (e.g., sender and receiver of the time-division frame 300). The time-division frame 300 also includes a payload portion 304, which occupies the time slots S10-S99 and is partitioned based on the link configuration ratio ($R_L$) to communicate the first type communications signal 204 and the second type communications signal 206. The time-division-based communications link 202(N) of FIG. 2 is configured to convey a continuous flow of the time-division frame 300. As such, the overall capacity of the time-division-based communications link 202(N) is determined by the number of slots in the time-division frame 300 communicated over a specific period of time. For example, if each of the one hundred (100) time slots is configured to carry one thousand (1000) encoded information bits, and the time-division-based communications link 202(N) can convey ten thousand (10000) of the time-division frames 300 each second, then the overall capacity of the time-division-based communications link 202(N) is one (1) gigabit (Gb) per second (s) (1 Gbps). As illustrated in FIG. 3, the payload portion 304 occupies ninety (90) time slots in the payload portion 304, out of the 100 time slots in the time-division frame 300. As such, the data throughput, which is determined by the payload portion 304, of the time-division-based communications link 202(N) is nine (9) Mbps. In this regard, it is possible to partition the time-division-based communications link 202(N) by dividing the 90 time slots in the payload portion 304 of the time-division frame 300 between the first type communications signal 204 and the second type communications signal 206. In this regard, partitioning the time-division-based communications link 202(N) hereinafter refers to partitioning the payload portion 304 of the time-division-based communications link 202(N).

In this regard, in a non-limiting example, if the link configuration ratio ($R_L$) is three-to-two (3:2), then the first type communications signal 204 is allocated three-fifths (⅗) of the 90 time slots in the payload portion 304 of the time-division frame 300 (time slots S10-S63). Accordingly, the second type communications signal 206 is allocated two-fifths (⅖) of the 90 time slots in the payload portion 304 of the time-division frame 300 (time slot S64-S99). In this regard, the 3:2 link configuration ratio ($R_L$) indicates that the first type communications signal 204 and the second type communications signal 206 are allocated sixty percent (60%) and forty percent (40%) of the capacity of the payload portion 304 of the time-division-based communications link 202(N), respectively.

The WDS 200 of FIG. 2 includes a central digital routing unit (DRU) 208. The central DRU 208 is configured to communicate the first type communications signal 204 with a first signal source 210. In a non-limiting example, the first signal source 210 is a digital baseband unit (BBU). As such, the first type communications signal 204 is a digital baseband type communications signal. The first type communications signal 204 may be communicated based on a common public radio interface (CPRI) protocol, an open base station architecture initiative (OBSAI) protocol, an open radio equipment interface (ORI) protocol, or any other standard or proprietary protocol. In this regard, the first type communications signal 204 includes in-phase (I) and quadrature (Q) samples (IQ samples), which are digital data representing I and Q components of samples of the digital baseband communications signal. Accordingly, the first signal source 210 is referred to as a source of IQ samples, which may be formatted into a time-division duplex stream according to the CPRI protocol, the OBSAI protocol, the ORI protocol, or any other standard or proprietary protocol.

The central DRU 208 is also configured to communicate the second type communications signal 206 with a second signal source 212. In a non-limiting example, the second signal source 212 is an Ethernet signal source, such as an Ethernet hub. In this regard, the second type communications signal 206 includes Ethernet packets communicated based on the Ethernet protocol. As such, the second signal source 212 is also referred to as an Ethernet backhaul, and the second type communications signal 206 is also referred to as an Ethernet type communications signal.

With reference back to FIG. 2, the WDS 200 includes a plurality of remote units 214(1)-214(N). In a first non-limiting example, the remote unit 214(1) is a remote antenna unit (RAU) that is configured to communicate only the first type communications signal 204. In this regard, the time-division-based communications link 202(1) is allocated one hundred percent (100%) for communicating the first type communications signal 204. In a second non-limiting example, the remote unit 214(2) is a communications device, for example, Wi-Fi access point (AP) or small cell, that operates based on the Ethernet protocol. In this regard, the time-division-based communications link 202(2) is allocated 100% for communicating the second type communications signal 206.

The remote unit 214(N) includes one or more network elements (e.g., RAU, DRU, Wi-Fi AP, and/or small cell) that are interconnected based on various topologies (e.g., daisy-chain topology, star topology, etc.). As such, the remote unit 214(N) is hereinafter referred to as a remote cluster 216. Since the network elements in the remote cluster 216 are configured to communicate both the first type communications signal 204 and the second type communications signal 206, it is thus necessary to partition the time-division-based communications link 202(N) to optimize overall capacity and performance of the remote cluster 216. The remote cluster 216 and the time-division-based communications link 202(N) are discussed hereinafter as non-limiting examples.

In this regard, at least one central protocols division routing circuit (PDRC) 218 is provided in the WDS 200. In one non-limiting example, the central PDRC 218 is a standalone software-capable hardware entity communicatively coupled to the central DRU 208. In another non-limiting example, the central PDRC 218 is provided inside the central DRU 208 and integrated with other elements (not shown) in the central DRU 208. The central PDRC 218 is configured to communicate the first type communications signal 204 and the second type communications signal 206. The central PDRC 218 is also configured to communicate the first type communications signal 204 and the second type communications signal 206 over the time-division-based communications link 202(N) with the remote cluster 216 based on the link configuration ratio ($R_L$). In one non-limiting example, the first type communications signal 204 and the second type communications signal 206 are downlink first type communications signal 204D and downlink second type communications signal 206D, respectively. In this regard, the central PDRC 218 is an originating point from which the downlink first type communications signal 204D and the downlink second type communications signal 206D are provided to the time-division-based communications link 202(N). In another non-limiting example, the first type communications signal 204 and the second type communications signal 206 are uplink first type communications signal 204U and uplink second type communications signal 206U, respectively. In this regard, the central PDRC 218 is a destination point to which the uplink first type communications signal 204U and the uplink second type communications signal 206U are provided from the time-division-based communications link 202(N).

With continuing reference to FIG. 2, the WDS 200 includes at least one remote PDRC 220 that is communicatively coupled to the remote cluster 216. The remote PDRC 220 is configured to communicate the first type communications signal 204 and the second type communications signal 206 over the time-division-based communications link 202(N) based on the link configuration ratio ($R_L$). When the first type communications signal 204 and the second type communications signal 206 are the downlink first type communications signal 204D and the downlink second type communications signal 206D, respectively, the remote PDRC 220 is a destination point at which the downlink first type communications signal 204D and the downlink second type communications signal 206D are received from the time-division-based communications link 202(N). When the first type communications signal 204 and the second type communications signal 206 are the uplink first type communications signal 204U and the uplink second type communications signal 206U, respectively, the remote PDRC 220 is an originating point from which the uplink first type communications signal 204U and the uplink second type communications signal 206U are provided to the time-division-based communications link 202(N). In this regard, the time-division-based communications link 202(N) is enabled by both the central PDRC 218 and the remote PDRC 220. The central PDRC 218 and the remote PDRC 220 are configured to re-structure the time-division frame 300 of FIG. 3 based on the link configuration ratio ($R_L$). According to the non-limiting example discussed in reference to FIG. 3, the central PDRC 218 and the remote PDRC 220 are configured to communicate the first type communications signal 204 and the second type communications signal 206 based on a 60%-40% split of the capacity of the time-division-based communications link 202(N).

The central PDRC 218 and the remote PDRC 220 can be configured to communicate the first type communications signal 204 and the second type communications signal 206 based on a process. In this regard, FIG. 4 is a flowchart of an exemplary process 400 for partitioning the time-division-based communications link 202(N) in the WDS 200 in FIG. 2 for communicating the first type communications signal 204 and the second type communications signal 206 over the time-division-based communications link 202(N).

Figure 4:
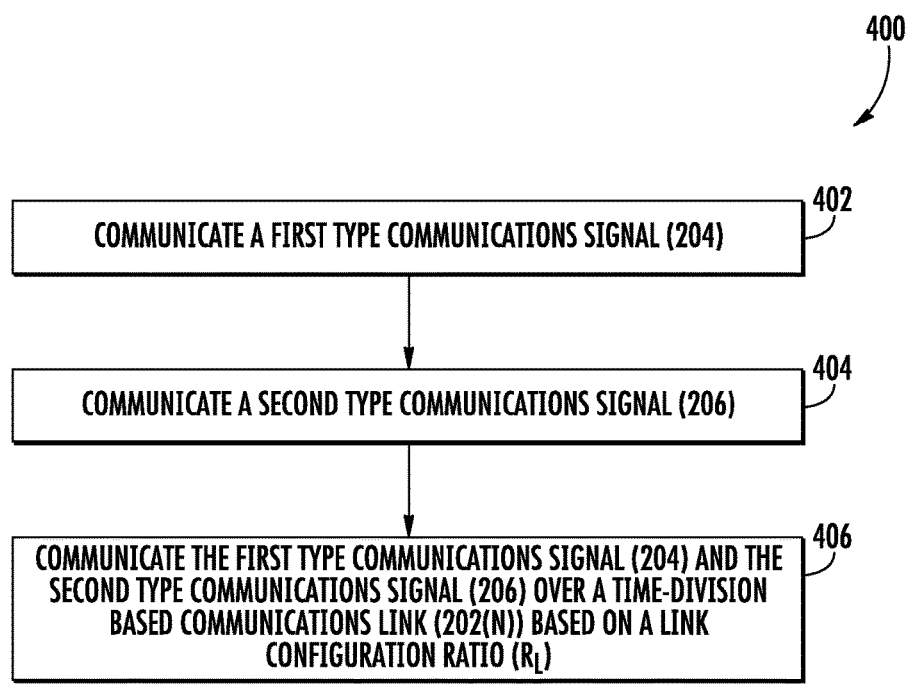
FIG. 4 is a flowchart of an exemplary process for partitioning a time-division-based communications link in the WDS in FIG. 2 for communicating a first type communications signal and a second type communications signal over the time-division-based communications link.

With reference to FIG. 4, the central PDRC 218 communicates the first type communications signal 204 (block 402). The central PDRC 218 also communicates the second type communications signal 206 (block 404). The central PDRC 218 then communicates the first type communications signal 204 and the second type communications signal 206 over the time-division-based communications link 202(N) based on the link configuration ratio ($R_L$) (block 406). With reference back to FIG. 2, on the other end of the time-division-based communications link 202(N), the remote PDRC 220 communicates the first type communications signal 204 and the second type communications signal 206 with the central PDRC 218 over the time-division-based communications link 202(N) based on the link configuration ratio ($R_L$). The remote PDRC 220 communicates the first type communications signal 204 and the second type communications signal 206 with the remote cluster 216.

The WDS 200 includes a link configuration controller 222. In a non-limiting example, the link configuration controller 222 is integrated with the central DRU 208. In another non-limiting example, the link configuration controller 222 is provided as a standalone software-capable hardware element communicatively coupled to the central DRU 208. The link configuration controller 222 is configured to determine the link configuration ratio ($R_L$) for the time-division-based communications link 202(N) and provide the link configuration ratio ($R_L$) to the central PDRC 218 and the remote PDRC 220. The link configuration controller 222 is configured to determine the link configuration ratio ($R_L$) based on one or more predefined link configuration policies that may be stored in a link configuration database 224. In this regard, the link configuration controller 222 may be provided as a microprocessor or a microcontroller, for example.

In this regard, FIG. 5 is a table 500 providing exemplary predefined link configuration policies that the link configuration controller 222 of FIG. 2 can use to determine the link configuration ratio ($R_L$) for partitioning the time-division-based communications link 202(N). Common elements between FIGS. 2 and 5 are shown therein with common element numbers and will not be re-described herein.

With reference to FIG. 5, the table 500, which defines a data structure for storing the predefined link configuration policies in storage media (e.g., memory, flash storage, etc.), includes a first column 502, a second column 504, and a third column 506. The first column 502 provides time-division-based communications link identifiers. The second column 504 lists frequency channels occupied by the first type communications signal 204. The third column 506 includes the predefined link configuration policy.

The table 500 includes a plurality of rows 508(1)-508(M), each corresponding to a respective time-division-based communications link, Link 1-Link M in this example, configured to communicate both the first type communications signal 204 and the second type communications signal 206. For example, the row 508(1) corresponds to the time-division-based communications link 202(N). In the row 508(1), the second column 504 indicates that the first type communications signal 204 occupies channels 642, 435, 455, 342, and 550. The third column 506 includes the predefined link configuration policies for the time-division-based communications link 202(N). In a non-limiting example, three predefined link configuration policies are defined for the time-division-based communications link 202(N). First, the second type communications signal 206 is allowed to occupy up to four gigabits per second (4 Gbps) capacity of the time-division-based communications link 202(N). Secondly, if the time-division-based communications link 202(N) has less than the 4 Gbps capacity for the second type communications signal 206, channel 642 will be eliminated from the first type communications signal 204. Thirdly, if the time-division-based communications link 202(N) is still unable to provide the 4 Gbps capacity for the second type communications signal 206, channel 455 will be further eliminated from the first type communications signal 204. In this regard, the predefined link configuration policies as defined in the third column 506 define possible trade-offs between the need for the first type communications signal 204 (e.g., IQ samples data) and the second type communications signal 206 (e.g., Ethernet packets).

With continuing reference to FIG. 5, the predefined link configuration policies may vary between different time-division-based communications links. In one non-limiting example, the third column 506 in the row 508(2) defines that the second type communications signal 206 is allowed to occupy up to 4 Gbps capacity of Link 2. If Link 2 is unable to provide the 4 Gbps capacity, one of the multiple-input multiple-output (MIMO) streams associated with channel 442 will be omitted. If Link 2 is still unable to provide the 4 Gbps capacity, one of the MIMO streams associated with channel 485 will be further omitted.

In another non-limiting example, the third column 506 in the row 508(3) defines that the second type communications signal 206 is allowed to occupy up to 4 Gbps capacity of Link 3. If Link 3 is unable to provide the 4 Gbps capacity, then an activate compression algorithm will be applied on channels 440 and 480 of the first type communications signal 204.

In another non-limiting example, the third column 506 in the row 508(M) defines that the second type communications signal 206 is allowed to occupy up to two gigabits per second (2 Gbps) capacity of Link M. If Link M is unable to provide the 2 Gbps capacity, then the number of bits used for the first type communications signal 204 will be reduced (e.g., reducing the number of bits from fourteen bits (14 bits) to ten bits (10 bits)). If Link M is still unable to provide the 2 Gbps capacity, then channel 410 from the first type communications signal 204 will be eliminated.

With reference back to FIG. 2, in a non-limiting example, the link configuration controller 222 determines the link configuration ratio ($R_L$) for the time-division-based communications link 202(N) in response to a link configuration request 226 provided by the central PDRC 218 and/or the remote PDRC 220. The central PDRC 218 and the remote PDRC 220 may include identification elements (not shown) configured to sense Ethernet usage (e.g., Ethernet traffic volume) by the second signal source 212 (the Ethernet backhaul). For example, the WDS 200 is configured to implement a Wi-Fi offloading policy to free up frequency channels occupied by the first type communications signal 204. As a result, the Ethernet traffic volume increases and the IQ samples data volume will decrease. In this regard, the central PDRC 218 and/or the remote PDRC 220 may sense the change in the Ethernet traffic volume and provide the link configuration request 226 to the link configuration controller 222 to redefine the link configuration ratio ($R_L$) for the time-division-based communications link 202(N).

With continuing reference to FIG. 2, the link configuration controller 222 may receive the link configuration request 226 over a dedicated management link 228 or via the time-division-based communications link 202(N). In response to receiving the link configuration request 226, the link configuration controller 222 determines or re-determines the link configuration ratio ($R_L$) based on the predefined link configuration policies stored in the link configuration database 224. The link configuration controller 222 may also take into consideration other configuration inputs 230 provided by other network elements (not shown) configured to sense Ethernet usage when determining the link configuration ratio ($R_L$). The other configuration inputs 230 may include information such as routings of the first type communications signal 204 and/or the second type communications signal 206. The link configuration controller 222 then provides the link configuration ratio ($R_L$) to the central PDRC 218 and the remote PDRC 220 via the dedicated management link 228 or the time-division-based communications link 202(N). In a non-limiting example, the link configuration controller 222 provides the link configuration ratio ($R_L$) to the central PDRC 218 and the remote PDRC 220 in one or more internet protocol (IP) packets.

Alternative to determining the link configuration ratio ($R_L$) at the link configuration controller 222, the link configuration controller 222 may download the predefined link configuration policies relevant to the time-division-based communications link 202(N). The link configuration controller 222 may provide the downloaded predefined link configuration polices to the central PDRC 218 and the remote PDRC 220 via the dedicated management link 228 or the time-division-based communications link 202(N). In turn, the central PDRC 218 and the remote PDRC 220 may determine the link configuration ratio ($R_L$) independently based on the downloaded predefined link configuration policy.

With continuing reference to FIG. 2, the link configuration controller 222 may determine or re-determine the link configuration ratio ($R_L$) in response to other types of triggers. In one non-limiting example, the link configuration controller 222 determines the link configuration ratio ($R_L$) based on the predefined link configuration policies stored in the link configuration database 224. In another non-limiting example, the link configuration controller 222 determines or re-determines the link configuration ratio ($R_L$) based on link configuration parameters received from users via a graphic user interface (GUI) (not shown). The GUI may be embedded in the link configuration controller 222.

In a non-limiting example, the link configuration controller 222 defines a downlink link configuration ratio ($R_{DL}$) for communicating the downlink first type communications signal 204D and the downlink second type communications signal 206D from the central DRU 208 to the remote cluster 216 over the time-division-based communications link 202(N). In another non-limiting example, the link configuration controller 222 defines an uplink link configuration ratio ($R_{UL}$) for communicating the uplink first type communications signal 204U and the uplink second type communications signal 206U from the remote cluster 216 to the central DRU 208 over the time-division-based communications link 202(N). The downlink link configuration ratio ($R_{DL}$) may be the same or different from the uplink link configuration ratio ($R_{UL}$).

With continuing reference to FIG. 2, the central DRU 208 is communicatively coupled to an electrical-to-optical (E/O) converter 232. The E/O converter 232 is configured to convert the downlink first type communications signal 204D into an optical downlink first type communications signal 234. The E/O converter 232 is also configured to convert the downlink second type communications signal 206D into an optical downlink second type communications signal 236.

The remote cluster 216 also includes a remote unit optical-to-electrical (O/E) converter 238. The remote unit O/E converter 238 is configured to convert the optical downlink first type communications signal 234 into the downlink first type communications signal 204D. The remote unit O/E converter 238 is also configured to convert the optical downlink second type communications signal 236 into the downlink second type communications signal 206D.

The remote cluster 216 also includes a remote unit E/O converter 240. The remote unit E/O converter 240 is configured to convert the uplink first type communications signal 204U into an optical uplink first type communications signal 242. The remote unit E/O converter 240 is also configured to convert the uplink second type communications signal 206U into an optical uplink second type communications signal 244.

The central DRU 208 is also communicatively coupled to an O/E converter 246. The O/E converter 246 is configured to convert the optical uplink first type communications signal 242 into the uplink first type communications signal 204U. The O/E converter 246 is also configured to convert the optical uplink second type communications signal 244 into the uplink second type communications signal 206U.

As previously discussed, the remote cluster 216 includes one or more network elements (e.g., RAU, DRU, Wi-Fi AP, and/or small cell) that are interconnected based on various topologies (e.g., daisy-chain topology, star topology, etc.). The various topologies inside the remote cluster 216 are discussed next with references to FIGS. 6A-6C.

Figure 6A:
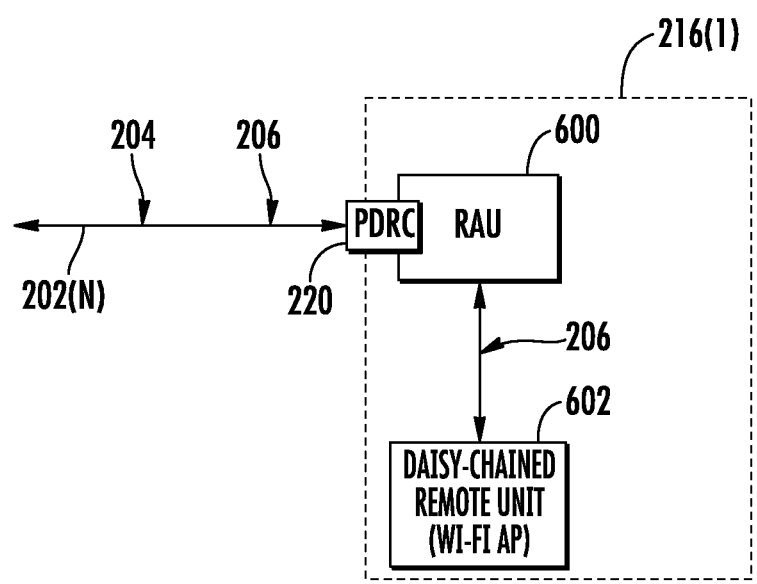
FIG. 6A is a schematic diagram of an exemplary remote cluster that includes a remote antenna unit (RAU) and can be provided in the WDS of FIG. 2 and configured to communicate a first type communications signal and a second type communications signal over a time-division-based communications link based on the link configuration ratio of FIG. 2.

In this regard, FIG. 6A is a schematic diagram of an exemplary remote cluster 216(1) that includes an RAU 600 and can be provided in the WDS 200 of FIG. 2 to communicate the first type communications signal 204 and the second type communications signal 206 over the time-division-based communications link 202(N) based on the link configuration ratio ($R_L$). Common elements between FIGS. 2 and 6A are shown therein with common element numbers and will not be re-described herein.

With reference to FIG. 6A, the remote cluster 216(1) also includes a daisy-chained remote unit 602 that is communicatively coupled to the RAU 600. In a non-limiting example, the daisy-chained remote unit 602 is a Wi-Fi AP. The RAU 600 communicates the first type communications signal 204 and the second type communications signal 206 with the remote PDRC 220. The daisy-chained remote unit 602 is configured to communicate the second type communications signal 206 with the RAU 600. In a non-limiting example, the remote PDRC 220 is embedded in the RAU 600.

Figure 6B:
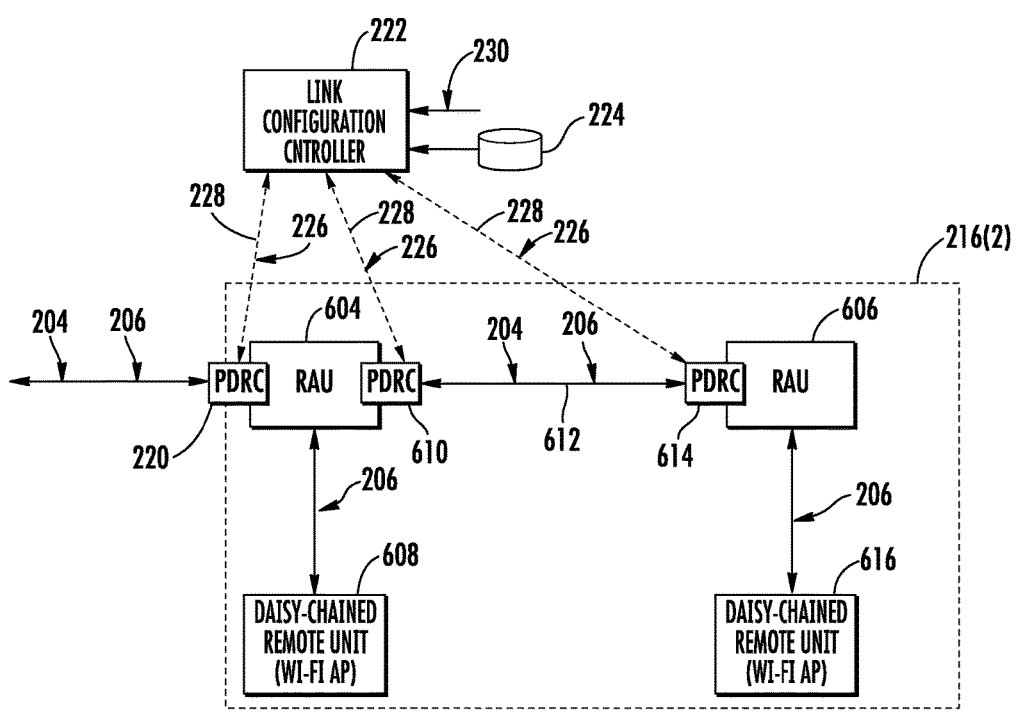
FIG. 6B is a schematic diagram of an exemplary remote cluster in which at least one first RAU and at least one second RAU are daisy-chained to communicate the first type communications signal and the second type communications signal over the time-division based communications link of FIG. 2.

FIG. 6B is a schematic diagram of an exemplary remote cluster 216(2) in which at least one first RAU 604 and at least one second RAU 606 are daisy-chained to communicate the first type communications signal 204 and the second type communications signal 206 over the time-division-based communications link 202(N) of FIG. 2. Common elements between FIGS. 2 and 6B are shown therein with common element numbers and will not be re-described herein.

With reference to FIG. 6B, the first RAU 604 is configured to communicate the first type communications signal 204 and the second type communications signal 206 with the remote PDRC 220. The remote cluster 216(2) includes a first daisy-chained remote unit 608 that is communicatively coupled to the first RAU 604. The first daisy-chained remote unit 608 is configured to communicate the second type communications signal 206 with the first RAU 604. In a non-limiting example, the first daisy-chained remote unit 608 is a Wi-Fi AP.

The remote cluster 216(2) also includes at least one first remote cluster PDRC 610. In a non-limiting example, the first remote cluster PDRC 610 is embedded in the first RAU 604, but functions independently from the remote PDRC 220. In another non-limiting example, the first remote cluster PDRC 610 is integrated with the remote PDRC 220. In this regard, the remote PDRC 220 is configured to function as the first remote cluster PDRC 610. As such, the remote PDRC 220 may provide multiple input/output (I/O) ports for multiple time-division-based communications links such as the time-division-based communications link 202(N) and a remote cluster time-division-based communications link 612.

The first remote cluster PDRC 610 is communicatively coupled to the remote cluster time-division-based communications link 612. The first remote cluster PDRC 610 is configured to communicate the first type communications signal 204 and the second type communications signal 206 over the remote cluster time-division-based communications link 612 based on a second link configuration ratio ($R'_L$).

The remote cluster 216(2) also includes at least one second remote cluster PDRC 614. In a non-limiting example, the second remote cluster PDRC 614 is embedded with the second RAU 606. The second remote cluster PDRC 614 is configured to communicate the first type communications signal 204 and the second type communications signal 206 with the first remote cluster PDRC 610 over the remote cluster time-division-based communications link 612 based on the second link configuration ratio ($R'_L$). The remote cluster 216(2) includes a second daisy-chained remote unit 616 that is communicatively coupled to the second RAU 606. The second daisy-chained remote unit 616 is configured to communicate the second type communications signal 206 with the second RAU 606. In a non-limiting example, the second daisy-chained remote unit 616 is a Wi-Fi AP.

The link configuration controller 222 is configured to determine the second link configuration ratio ($R'_L$) based on the predefined link configuration policies stored in the link configuration database 224. In addition, the link configuration controller 222 may also take into consideration the first link configuration ratio ($R_L$) of the time-division-based communications link 202(N) when determining the second link configuration ratio ($R'_L$). The link configuration controller 222 is configured to provide the second link configuration ratio ($R'_L$) to the first remote cluster PDRC 610 and the second remote cluster PDRC 614 either via the dedicated management link 228 or the remote cluster time-division-based communications link 612. In a non-limiting example, the link configuration controller 222 provides the second link configuration ratio ($R'_L$) to the first remote cluster PDRC 610 and the second remote cluster PDRC 614 in one or more IP packets.

The link configuration controller 222 may download the predefined link configuration policies relevant to the remote cluster time-division-based communications link 612. The link configuration controller 222 may provide the downloaded predefined link configuration polices to the first remote cluster PDRC 610 and the second remote cluster PDRC 614 via the dedicated management link 228 or the remote cluster time-division-based communications link 612. In turn, the first remote cluster PDRC 610 and the second remote cluster PDRC 614 may determine the second link configuration ratio ($R'_L$) independently based on the downloaded predefined link configuration policies.

Although the remote cluster 216(2) in FIG. 6B is shown to include the first RAU 604 and the second RAU 606, it shall be appreciated that the remote cluster 216(2) can include more than two daisy-chained RAUs. Likewise, the remote cluster 216(2) may also include more than two daisy-chained remote units that are communicatively coupled to the more than two daisy-chained RAUs.

Figure 6C:
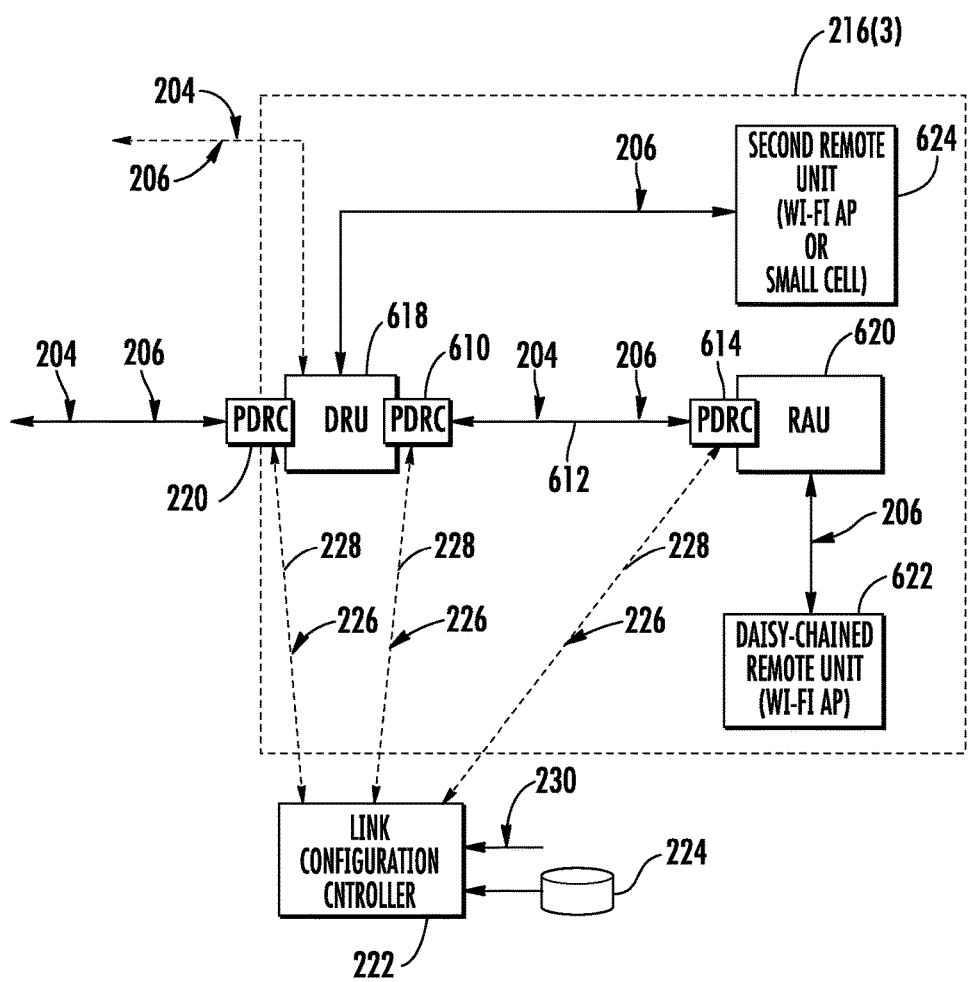
FIG. 6C is a schematic diagram of an exemplary remote cluster configured according to a star topology to communicate the first type communications signal and the second type communications signal over the time-division based communications link of FIG. 2.

FIG. 6C is a schematic diagram of an exemplary remote cluster 216(3) configured according to a star topology to communicate the first type communications signal 204 and the second type communications signal 206 over the time-division-based communications link 202(N) of FIG. 2. Common elements between FIGS. 2, 6B, and 6C are shown therein with common element numbers and will not be re-described herein.

With reference to FIG. 6C, the remote cluster 216(3) includes a remote digital routing unit (DRU) 618. In a non-limiting example, the remote DRU 618 is functionally equivalent to an IP router. The remote DRU 618 is configured to communicate the first type communications signal 204 and the second type communications signal 206 with the remote PDRC 220. In a non-limiting example, the remote DRU 618 can be configured to communicate the first type communications signal 204 with the first signal source 210 (not shown). The remote DRU 618 can also be configured to communicate the second type communications signal 206 with the second signal source 212 (not shown).

The remote cluster 216(3) also includes the first remote cluster PDRC 610. In a non-limiting example, the first remote cluster PDRC 610 is embedded in the remote DRU 618 and communicatively coupled to the remote DRU 618, but functions independently from the remote PDRC 220. In another non-limiting example, the first remote cluster PDRC 610 is integrated with the remote PDRC 220. In this regard, the remote PDRC 220 is configured to function as the first remote cluster PDRC 610.

The first remote cluster PDRC 610 is communicatively coupled to the remote cluster time-division-based communications link 612. The first remote cluster PDRC 610 is configured to communicate the first type communications signal 204 and the second type communications signal 206 over the remote cluster time-division-based communications link 612 based on the second link configuration ratio ($R'_L$).

The remote cluster 216(3) also includes the second remote cluster PDRC 614 communicatively coupled to at least one RAU 620. In a non-limiting example, the second remote cluster PDRC 614 is embedded with the RAU 620. The second remote cluster PDRC 614 is configured to communicate the first type communications signal 204 and the second type communications signal 206 with the first remote cluster PDRC 610 over the remote cluster time-division-based communications link 612 based on the second link configuration ratio ($R'_L$). The remote cluster 216(3) also includes at least one first daisy-chained remote unit 622 that is communicatively coupled to the RAU 620. The first daisy-chained remote unit 622 is configured to communicate the second type communications signal 206 with the RAU 620. In a non-limiting example, the first daisy-chained remote unit 622 is a Wi-Fi AP.

The link configuration controller 222 is configured to determine the second link configuration ratio ($R'_L$) based on the predefined link configuration policies stored in the link configuration database 224. In addition, the link configuration controller 222 may also take into consideration the first link configuration ratio ($R_L$) of the time-division-based communications link 202(N) of FIG. 2 when determining the second link configuration ratio ($R'_L$). The link configuration controller 222 is configured to provide the second link configuration ratio ($R'_L$) to the first remote cluster PDRC 610 and the second remote cluster PDRC 614 either via the dedicated management link 228 or the remote cluster time-division-based communications link 612. In a non-limiting example, the link configuration controller 222 provides the second link configuration ratio ($R'_L$) to the first remote cluster PDRC 610 and the second remote cluster PDRC 614 in one or more IP packets.

The link configuration controller 222 may download the predefined link configuration policies relevant to the remote cluster time-division-based communications link 612. The link configuration controller 222 may provide the downloaded predefined link configuration polices to the first remote cluster PDRC 610 and the second remote cluster PDRC 614 via the dedicated management link 228 or the remote cluster time-division-based communications link 612. In turn, the first remote cluster PDRC 610 and the second remote cluster PDRC 614 may determine the second link configuration ratio (R'$_L$) independently based on the downloaded predefined link configuration policies.

The remote cluster 216(3) also includes at least one second remote unit 624 configured to communicate the second type communications signal 206 with the remote DRU 618. In a non-limiting example, the second remote unit 624 includes a Wi-Fi AP and/or a small cell (SC).

Although the remote cluster 216(3) in FIG. 6C is shown to include the RAU 620, it shall be appreciated that the remote cluster 216(3) can include more than one RAU. Likewise, the remote cluster 216(3) may also include more than two remote units.

Figure 7:
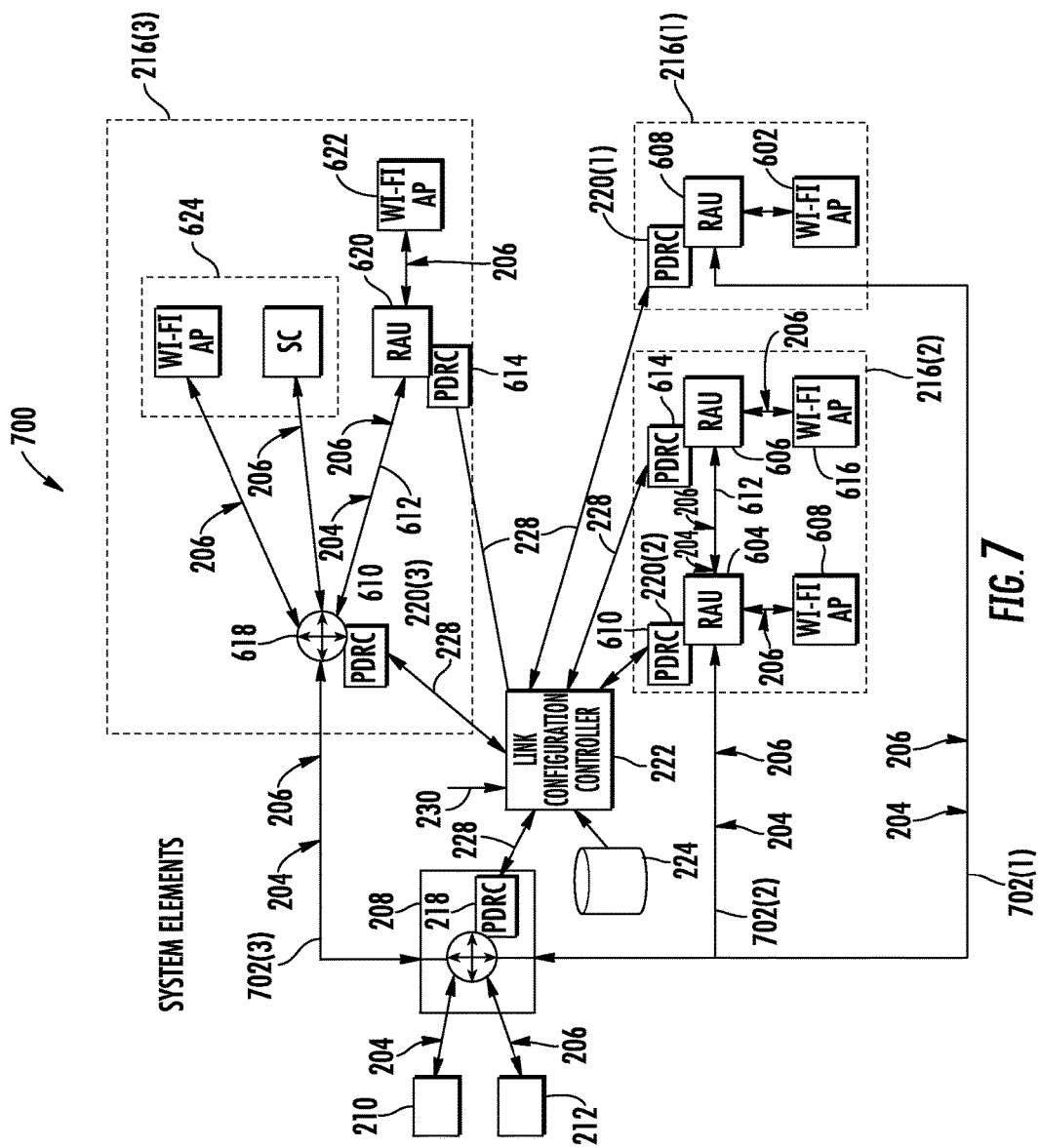
FIG. 7 is a schematic diagram of an exemplary WDS 700 including the remote clusters of FIGS. 6A-6C.

The remote cluster 216(1) of FIG. 6A, the remote cluster 216(2) of FIG. 6B, and the remote cluster 216(3) of FIG. 6C can co-exist in a WDS. In this regard, FIG. 7 is a schematic diagram of an exemplary WDS 700 including the remote cluster 216(1) of FIG. 6A, the remote cluster 216(2) of FIG. 6B, and the remote cluster 216(3) of FIG. 6C. Common elements between FIGS. 2, 6A, 6B, 6C, and 7 are shown therein with common element numbers and will not be re-described herein.

With reference to FIG. 7, the remote clusters 216(1)-216(3) are communicatively coupled to the central DRU 208 over time-division-based communications links 702(1)-702(3), respectively. Each of the time-division-based communications links 702(1)-702(3) is functionally equivalent to the time-division-based communications links 202(1)-202(N) of FIG. 2. In a non-limiting example, the central PDRC 218 is configured to communicate the first type communications signal 204 and the second type communications signal 206 over all of the time-division-based communications links 702(1)-702(3) based on respective link configuration ratios $R_{L1}$, $R_{L2}$, and $R_{L3}$. The link configuration ratios $R_{L1}$, $R_{L2}$, and $R_{L3}$ may be configured to be identical or different.

As previously discussed in FIG. 6B, the remote PDRC 220 may provide multiple input/output (I/O) ports for multiple time-division-based communications links such as the time-division-based communications link 202(N) and the remote cluster time-division-based communications link 612. Also, as discussed above, the central PDRC 218 is configured to communicate the first type communications signal 204 and the second type communications signal 206 over all of the time-division-based communications links 702(1)-702(3). To be able to support multiple time-division-based communications links, the central PDRC 218 and remote PDRC 220 each need to support multiple I/O ports.

Figure 8:
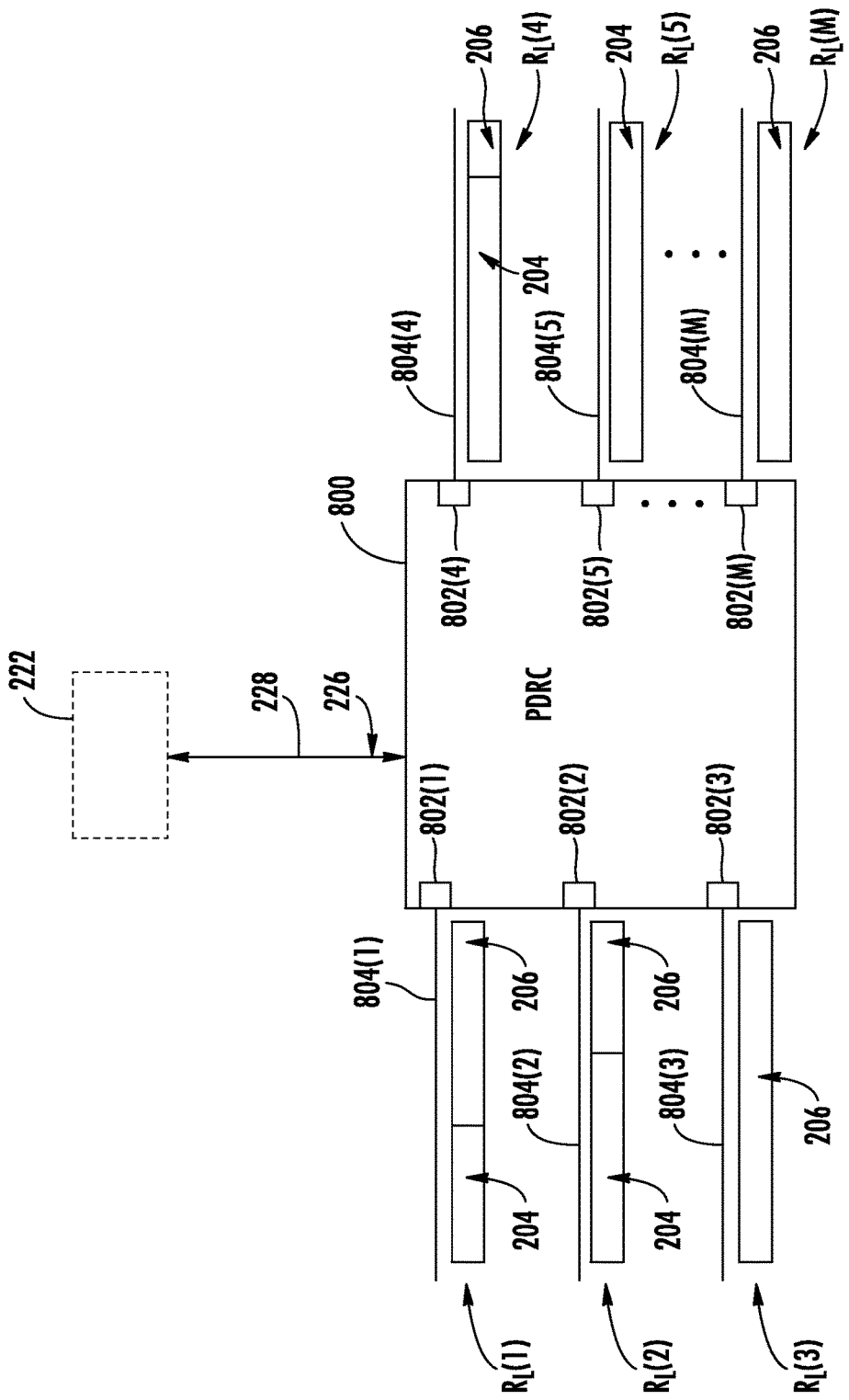
FIG. 8 is a schematic diagram of an exemplary protocols division routing circuit including a plurality of input/output (I/O) ports for supporting a plurality of time-division-based communications links based on a plurality of link configuration ratios, respectively.

In this regard, FIG. 8 is a schematic diagram of an exemplary PDRC 800 including a plurality of I/O ports 802(1)-802(M) for supporting a plurality of time-division-based communications links 804(1)-804(M) based on a plurality of link configuration ratios $R_L(1)$-$R_L(M)$, respectively. Common elements between FIGS. 2 and 8 are shown therein with common element numbers and will not be re-described herein.

With reference to FIG. 8, the I/O port 802(1) is configured to support the time-division-based communications link 804(1) based on the link configuration ratio $R_L(1)$. The time-division-based communications link 804(1) is configured to communicate the first type communications signal 204 and the second type communications signal 206. Therefore, the link configuration ratio $R_L(1)$ partitions the time-division-based communications link 804(1) between the first type communications signal 204 and the second type communications signal 206.

The I/O port 802(2) is configured to support the time-division-based communications link 804(2) based on the link configuration ratio $R_L(2)$. The time-division-based communications link 804(2) is also configured to communicate the first type communications signal 204 and the second type communications signal 206. Therefore, the link configuration ratio $R_L(2)$ partitions the time-division-based communications link 804(2) between the first type communications signal 204 and the second type communications signal 206.

The I/O port 802(3) is configured to support the time-division-based communications link 804(3) based on the link configuration ratio $R_L(3)$. The time-division-based communications link 804(3) is configured to communicate only the second type communications signal 206. Therefore, the link configuration ratio $R_L(3)$ assigns the time-division-based communications link 804(3) entirely to the second type communications signal 206.

The I/O port 802(4) is configured to support the time-division-based communications link 804(4) based on the link configuration ratio $R_L(4)$. The time-division-based communications link 804(4) is configured to communicate the first type communications signal 204 and the second type communications signal 206. Therefore, the link configuration ratio $R_L(4)$ partitions the time-division-based communications link 804(4) between the first type communications signal 204 and the second type communications signal 206.

The I/O port 802(5) is configured to support the time-division-based communications link 804(5) based on the link configuration ratio $R_L(5)$. The time-division-based communications link 804(5) is configured to communicate only the first type communications signal 204. Therefore, the link configuration ratio $R_L(5)$ assigns the time-division-based communications link 804(5) entirely to the first type communications signal 204.

The I/O port 802(M) is configured to support the time-division-based communications link 804(M) based on the link configuration ratio $R_L(M)$. The time-division-based communications link 804(M) is configured to communicate only the second type communications signal 206. Therefore, the link configuration ratio $R_L(M)$ assigns the time-division-based communications link 804(M) entirely to the second type communications signal 206.

With continuing reference to FIG. 8, in a non-limiting example, the PDRC 800 is configured to sense one or more of the first type communications signal 204 and the second type communications signal 206 communicated through the I/O ports 802(1)-802(M) to obtain additional information to help determine the link configuration ratios $R_L(1)$-$R_L(M)$. For example, the PDRC 800 can sense traffic volume, measure data payload, and/or identify bandwidth requirements of the first type communications signal 204 and the second type communications signal 206. The PDRC 800 may provide the additional information to the link configuration controller 222 and receive the link configuration ratios $R_L(1)$-$R_L(M)$ via the dedicated management link 228. The PDRC 800 may also determine the link configuration ratios $R_L(1)$-$R_L(M)$ locally based on predefined link configuration policies provided by the link configuration controller 222 over the dedicated management link 228.

Figure 9:
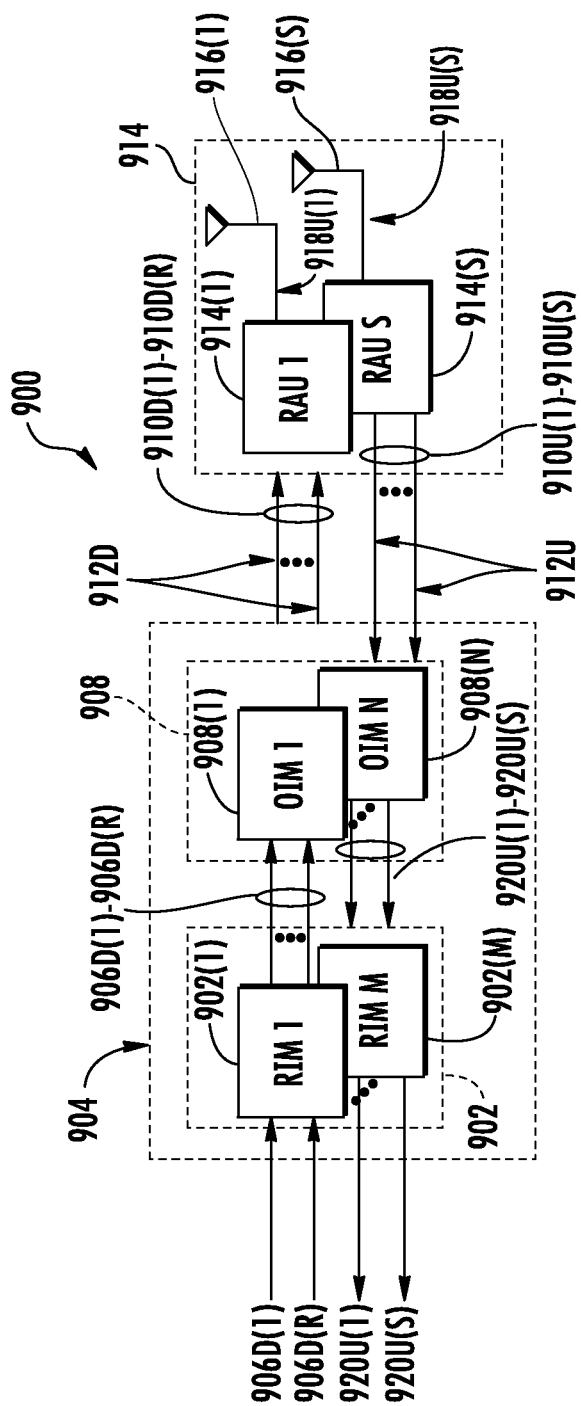
FIG. 9 is a schematic diagram of an exemplary optical fiber-based WDS provided in the form of an optical fiber-based DAS that includes at least one time-division-based communications link among a plurality of time-division-based communications links configured to be partitioned based on a link configuration ratio to communicate different types of communications signals.

FIG. 9 is a schematic diagram of an exemplary optical fiber-based WDS 900 provided in the form of an optical fiber-based DAS that includes the time-division-based communications link 202(N) among the time-division-based communications links 202(1)-202(N) of FIG. 2 configured to be partitioned based on a link configuration ratio ($R_L$) to communicate different types of communications signals. The WDS 900 includes an optical fiber for distributing communications services for multiple frequency bands. The WDS 900 in this example is comprised of three (3) main components. One or more radio interfaces provided in the form of radio interface modules (RIMs) 902(1)-902(M) are provided in a central unit 904 to receive and process downlink electrical communications signals 906D(1)-906D(R) prior to optical conversion into downlink optical fiber-based communications signals. The downlink electrical communications signals 906D(1)-906D(R) may be received from a base station (not shown) as an example. The RIMs 902(1)-902(M) provide both downlink and uplink interfaces for signal processing. The notations "1-R" and "1-M" indicate that any number of the referenced component, 1-R and 1-M, respectively, may be provided. The central unit 904 is configured to accept the RIMs 902(1)-902(M) as modular components that can easily be installed and removed or replaced in the central unit 904. In one example, the central unit 904 is configured to support up to twelve (12) RIMs 902(1)-902(12). Each RIM 902(1)-902(M) can be designed to support a particular type of radio source or range of radio sources (i.e., frequencies) to provide flexibility in configuring the central unit 904 and the WDS 900 to support the desired radio sources.

For example, one RIM 902 may be configured to support the PCS radio band. Another RIM 902 may be configured to support the 800 MHz radio band. In this example, by inclusion of these RIMs 902, the central unit 904 could be configured to support and distribute communications signals on both PCS and LTE 700 radio bands, as an example. The RIMs 902 may be provided in the central unit 904 that support any frequency bands desired, including but not limited to the US Cellular band, PCS band, AWS band, 700 MHz band, Global System for Mobile communications (GSM) 900, GSM 1800, and Universal Mobile Telecommunications System (UMTS). The RIMs 902(1)-902(M) may also be provided in the central unit 904 that support any wireless technologies desired, including but not limited to Code Division Multiple Access (CDMA), CDMA200, 1xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 902(1)-902(M) may be provided in the central unit 904 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 9, the downlink electrical communications signals 906D(1)-906D(R) are provided to a plurality of optical interfaces provided in the form of optical interface modules (OIMs) 908(1)-908(N) in this embodiment to convert the downlink electrical communications signals 906D(1)-906D(R) into downlink optical fiber-based communications signals 910D(1)-910D(R). The notation "1-N" indicates that any number of the referenced component 1-N may be provided. The OIMs 908(1)-908(N) may be configured to provide one or more optical interface components (OICs) that contain O/E and E/O converters, as will be described in more detail below. The OIMs 908(1)-908(N) support the radio bands that can be provided by the RIMs 902(1)-902(M), including the examples previously described above.

The OIMs 908(1)-908(N) each include E/O converters to convert the downlink electrical communications signals 906D(1)-906D(R) into the downlink optical fiber-based communications signals 910D(1)-910D(R). The downlink optical fiber-based communications signals 910D(1)-910D(R) are communicated over a downlink optical fiber-based communications medium 912D to a plurality of RAUs 914(1)-914(S). The notation "1-S" indicates that any number of the referenced component 1-S may be provided. O/E converters provided in the RAUs 914(1)-914(S) convert the downlink optical fiber-based communications signals 910D(1)-910D(R) back into the downlink electrical communications signals 906D(1)-906D(R), which are provided to antennas 916(1)-916(S) in the RAUs 914(1)-914(S) to client devices (not shown) in the reception range of the antennas 916(1)-916(S).

E/O converters are also provided in the RAUs 914(1)-914(S) to convert uplink electrical communications signals 918U(1)-918U(S) received from client devices through the antennas 916(1)-916(S) into uplink optical fiber-based communications signals 910U(1)-910U(S). The RAUs 914(1)-914(S) communicate the uplink optical fiber-based communications signals 910U(1)-910U(S) over an uplink optical fiber-based communications medium 912U to the OIMs 908(1)-908(N) in the central unit 904. The OIMs 908(1)-908(N) include O/E converters that convert the received uplink optical fiber-based communications signals 910U(1)-910U(S) into uplink electrical communications signals 920U(1)-920U(S), which are processed by the RIMs 902(1)-902(M) and provided as uplink electrical communications signals 920U(1)-920U(S). The central unit 904 may provide the uplink electrical communications signals 920U(1)-920U(S) to a base station or other communications system.

Note that the downlink optical fiber-based communications medium 912D and the uplink optical fiber-based communications medium 912U connected to each RAU 914(1)-914(S) may be a common optical fiber-based communications medium, wherein for example, wave division multiplexing (WDM) is employed to provide the downlink optical fiber-based communications signals 910D(1)-910D(R) and the uplink optical fiber-based communications signals 910U(1)-910U(S) on the same optical fiber-based communications medium.

Figure 10:
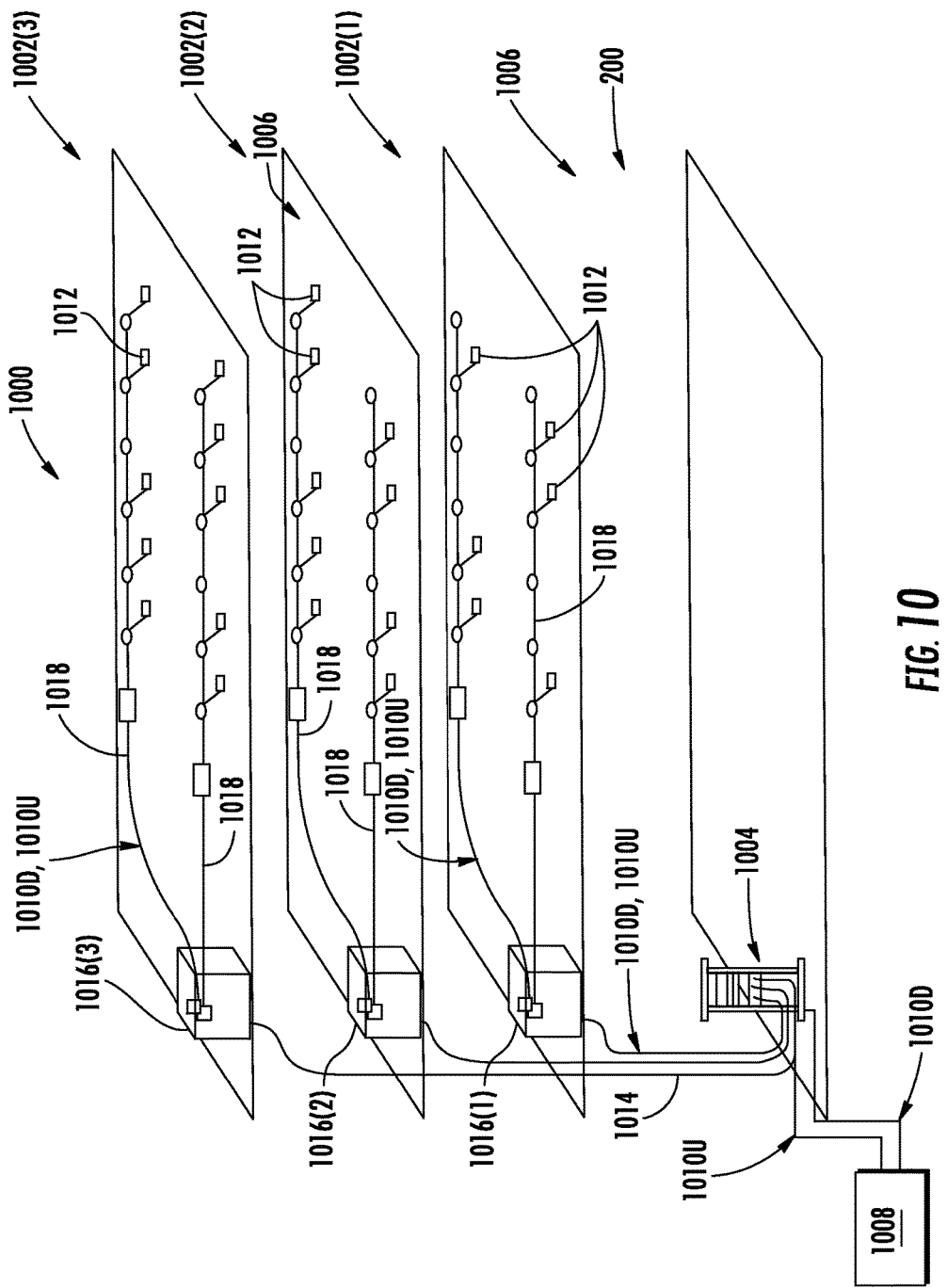
FIG. 10 is a partial schematic cut-away diagram of an exemplary building infrastructure in which the WDS of FIG.

The WDS 200 of FIG. 2, which is configured to enable partitioning of the time-division-based communications link 202(N) based on the link configuration ratio ($R_L$), may be provided in an indoor environment, as illustrated in FIG. 10. FIG. 10 is a partial schematic cut-away diagram of an exemplary building infrastructure 1000 in which WDSs configured to enable partitioning of the time-division-based communications link 202(N) based on the link configuration ratio ($R_L$), including the WDS 200 of FIG. 2, can be employed. The building infrastructure 1000 in this embodiment includes a first (ground) floor 1002(1), a second floor 1002(2), and a third floor 1002(3). The floors 1002(1)-1002(3) are serviced by a central unit 1004 to provide antenna coverage areas 1006 in the building infrastructure 1000. The central unit 1004 is communicatively coupled to a base station 1008 to receive downlink communications signals 1010D from the base station 1008. The central unit 1004 is communicatively coupled to a plurality of remote units 1012 to distribute the downlink communications signals 1010D to the remote units 1012 and to receive uplink communications signals 1010U from the remote units 1012, as previously discussed above. The downlink communications signals 1010D and the uplink communications signals 1010U communicated between the central unit 1004 and the remote units 1012 are carried over a riser cable 1014. The riser cable 1014 may be routed through interconnect units (ICUs) 1016(1)-1016(3) dedicated to each of the floors 1002(1)-1002(3) that route the downlink communications signals 1010D and the uplink communications signals 1010U to the remote units 1012 and also provide power to the remote units 1012 via array cables 1018.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.), and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A wireless distribution system (WDS), comprising:
    a plurality of remote units, wherein at least one remote unit among the plurality of remote units comprises a remote cluster;
    a central digital routing unit (DRU) communicatively coupled to the plurality of remote units over a plurality of communications links, wherein the central DRU is communicatively coupled to the remote cluster by a time-division-based communications link among the plurality of communications links;
    the central DRU configured to:
        communicate a first type communications signal with a first signal source; and
        communicate a second type communications signal with a second signal source;
    at least one central protocols division routing circuit (PDRC) communicatively coupled to the central DRU and the time-division-based communications link, the at least one central PDRC configured to communicate the first type communications signal and the second type communications signal at different times over the time-division-based communications link with the remote cluster based on a link configuration ratio; and
    at least one remote PDRC communicatively counted to the remote cluster and the time-division-based communications link, the at least one remote PDRC configured to communicate the first type communications signal and the second type communications signal with the central DRU over the time-division-based communications link based on the link configuration ratio;
    wherein the remote cluster comprises:
        at least one first remote antenna unit (RAU) configured to communicate the first type communications signal and the second type communications signal with the at least one remote PDRC;
        at least one first daisy-chained remote unit configured to communicate the second type communications signal with the at least one first RAU;
        at least one first remote cluster PDRC configured to communicate the first type communications signal and the second type communications signal over a remote cluster time-division-based communications link based on a second link configuration ratio;
        at least one second remote cluster PDRC configured to communicate the first type communications signal and the second type communications signal with the at least one first remote cluster PDRC over the remote cluster time-division-based communications link based on the second link configuration ratio;
        at least one second RAU configured to communicate the first type communications signal and the second type communications signal with the at least one second remote cluster PDRC; and
        at least one second daisy-chained remote unit configured to communicate the second type communications signal with the at least one second RAU.

2. The WDS of claim 1, wherein a remote unit among the plurality of remote units is configured to communicate at least one of the first type communications signal and the second type communications signal with the central DRU.

3. The WDS of claim 2, wherein the remote unit configured to communicate the first type communications signal is selected from the group consisting of: an RAU; a Wi-Fi access point (AP); and a small cell.

4. The WDS of claim 2, wherein the remote unit configured to communicate the second type communications signal is selected from the group consisting of: an RAU; a Wi-Fi access point (AP); and a small cell.

5. The WDS of claim 2, wherein the remote unit is further configured to communicate a control/management signal with the central DRU.

6. The WDS of claim 5, wherein the remote unit configured to communicate the control/management signal is selected from the group consisting of: an RAU; a Wi-Fi access point (AP); and a small cell.

7. The WDS of claim 1, wherein the first signal source is comprised of a digital baseband unit (BBU) and the second signal source is comprised of an Ethernet signal source.

8. The WDS of claim 7, wherein:
the first type communications signal is comprised of a digital baseband type communications signal; and
the second type communications signal is comprised of an Ethernet type communications signal.

9. The WDS of claim 8, wherein the first type communications signal is communicated based on a protocol selected from the group consisting of: a common public radio interface (CPRI) protocol; an open base station architecture initiative (OBSAI) protocol; an open radio equipment interface (ORI) protocol; and a proprietary protocol.

10. The WDS of claim 8, wherein the first type communications signal comprises in-phase (I) and quadrature (Q) samples (IQ samples), wherein the IQ samples are digital data representing I and Q components of samples of the digital baseband type communications signal.

11. The WDS of claim 1, wherein the at least one central PDRC is provided in the central DRU and communicatively coupled to the time-division-based communications link.

12. The WDS of claim 1, wherein the at least one remote PDRC is provided in the remote cluster.

13. The WDS of claim 1, further comprising a link configuration controller communicatively coupled to the at least one central PDRC and the at least one remote PDRC, the link configuration controller configured to:
determine the link configuration ratio for the time-division-based communications link based on one or more predefined link configuration policies; and
provide the link configuration ratio to the at least one central PDRC and the at least one remote PDRC.

14. The WDS of claim 13, wherein the link configuration controller is further configured to provide the link configuration ratio to the at least one central PDRC and the at least one remote PDRC in one or more internet protocol (IP) packets.

15. The WDS of claim 13, wherein the remote cluster comprises:
at least one RAU communicatively coupled to the at least one remote PDRC and configured to communicate the first type communications signal and the second type communications signal with the at least one remote PARC; and
at least one daisy-chained remote unit communicatively coupled to the at least one RAU and configured to communicate the second type communications signal with the at least one RAU.

16. The WDS of claim 15, wherein the at least one daisy-chained remote unit is comprised of a Wi-Fi access point (AP).

17. The WDS of claim 15, wherein the at least one RAU comprises the at least one remote PDRC.

18. The WDS of claim 13, wherein the link configuration controller is communicatively coupled to the at least one first remote cluster PDRC and the at least one second remote cluster PDRC, the link configuration controller further configured to:
determine the second link configuration ratio for the remote cluster time-division-based communications link based on the one or more predefined link configuration policies; and
provide the second link configuration ratio to the at least one first remote cluster PARC and the at least one second remote cluster PDRC.

19. The WDS of claim 18, wherein the link configuration controller is further configured to provide the second link configuration ratio to the at least one first remote cluster PDRC and the at least one second remote cluster PDRC in one or more internet protocol (IP) packets.

20. The WDS of claim 13, wherein the at least one first RAU comprises the at least one remote PDRC and the at least one first remote cluster PDRC.

21. The WDS of claim 13, wherein the at least one remote PDRC comprises the at least one first remote cluster PDRC.

22. The WDS of claim 13, wherein the at least one second RAU comprises the at least one second remote cluster PARC.

23. The WDS of claim 13, wherein the at least one first daisy-chained remote unit and the at least one second daisy-chained remote unit are Wi-Fi access points (APs).

24. The WDS of claim 1, wherein:
the central DRU is further configured to:
receive a downlink first type communications signal from the first signal source; and
receive a downlink second type communications signal from the second signal source; and
the at least one central PDRC is further configured to communicate the downlink first type communications signal and the downlink second type communications signal at different times over the time-division-based communications link with the remote cluster based on a downlink link configuration ratio.

25. The WDS of claim 24, wherein:
the at least one central PDRC is further configured to receive an uplink first type communications signal and an uplink second type communications signal at different times over the time-division-based communications link from the remote cluster based on an uplink link configuration ratio; and
the central DRU is further configured to:
provide the uplink first type communications signal to the first signal source; and
provide the uplink second type communications signal to the second signal source.

26. The WDS of claim 25, wherein:
the central DRU is communicatively coupled to an electrical-to-optical (E/O) converter and an optical-to-electrical (O/E) converter;
the E/O converter is configured to:
convert the downlink first type communications signal into an optical downlink first type communications signal; and
convert the downlink second type communications signal into an optical downlink second type communications signal;
the remote cluster comprises:
a remote unit O/E converter configured to:
convert the optical downlink first type communications signal into the downlink first type communications signal; and
convert the optical downlink second type communications signal into the downlink second type communications signal; and
a remote unit E/O converter configured to:
convert the uplink first type communications signal into an optical uplink first type communications signal; and convert the uplink second type communications signal into optical uplink second type communications signal; and the O/E converter is configured to:
convert the optical uplink first type communications signal into the uplink first type communications signal; and
convert the optical uplink second type communications signal into the uplink second type communications signal.

27. The WDS of claim 1, further comprising a link configuration controller configured to determine the link configuration ratio such that the link configuration ratio indicates a ratio of time that the time-division-based communications link is to be partitioned between the first and second types of communications signals.

28. The WDS of claim 1, further comprising a link configuration controller configured to determine the link configuration ratio based on sensed actual characteristics of one or more of the first type communications signal and the second type communications signal.

29. A wireless distribution system (WDS), comprising:
a plurality of remote units, wherein at least one remote unit among the plurality of remote units comprises a remote cluster;
a central digital routing unit (DRU) communicatively coupled to the plurality of remote units over a plurality of communications links, wherein the central DRU is communicatively coupled to the remote cluster by a time-division-based communications link among the plurality of communications links;
the central DRU configured to:
communicate a first type communications signal with a first signal source; and
communicate a second type communications signal with a second signal source;
at least one central protocols division routing circuit (PDRC) communicatively coupled to the central DRU and the time-division-based communications link, the at least one central PDRC configured to communicate the first type communications signal and the second type communications signal at different times over the time-division-based communications link with the remote cluster based on a link configuration ratio;
at least one remote PDRC communicatively coupled to the remote cluster and the time-division-based communications link, the at least one remote PDRC configured to communicate the first type communications signal and the second type communications signal with the central DRU over the time-division-based communications link based on the link configuration ratio; and
a link configuration controller communicatively coupled to the at least one central PDRC and the at least one remote PDRC, the link configuration controller configured to:
determine the link configuration ratio for the time-division-based communications link based on one or more predefined link configuration policies; and
provide the link configuration ratio to the at least one central PDRC and the at least one remote PDRC;
wherein the remote cluster comprises:
a remote DRU configured to communicate the first type communications signal and the second type communications signal with the at least one remote PDRC;
at least one first remote cluster PDRC communicatively coupled to the remote DRU, the at least one first remote cluster PDRC configured to communicate the first type communications signal and the second type communications signal over a remote cluster time-division-based communications link based on a second link configuration ratio;
at least one second remote cluster PDRC configured to communicate the first type communications signal and the second type communications signal with the at least one first remote cluster PDRC over the remote cluster time-division-based communications link based on the second link configuration ratio;
at least one remote antenna unit (RAU) configured to communicate the first type communications signal and the second type communications signal with the at least one second remote cluster PDRC;
at least one first daisy-chained remote unit configured to communicate the second type communications signal with the at least one RAU; and
at least one second remote unit configured to communicate the second type communications signal with the remote DRU.

30. The WDS of claim 29, wherein the link configuration controller is communicatively coupled to the at least one first remote cluster PDRC and the at least one second remote cluster PDRC, the link configuration controller further configured to:
determine the second link configuration ratio for the remote cluster time-division-based communications link based on the one or more predefined link configuration policies; and
provide the second link configuration ratio to the at least one first remote cluster PDRC and the at least one second remote cluster PDRC.

31. The WDS of claim 30, wherein the link configuration controller is further configured to provide the second link configuration ratio to the at least one first remote cluster PDRC and the at least one second remote cluster PDRC in one or more Internet protocol (IP) packets.

32. The WDS of claim 29, wherein the remote DRU comprises the at least one remote PARC and the at least one first remote cluster PDRC.

33. The WDS of claim 29, wherein the at least one remote PDRC comprises the at least one first remote cluster PDRC.

34. The WDS of claim 29, wherein the at least one RAU comprises the at least one second remote cluster PDRC.

35. The WDS of claim 29, wherein the at least one first daisy-chained remote unit and the at least one second remote unit are Wi-Fi access points (APs).

36. The WDS of claim 29, wherein the at least one first daisy-chained remote unit is comprised of a Wi-Fi access point (AP) and the at least one second remote unit is comprised of a small cell.

37. The WDS of claim 29, wherein the remote DRU is further configured to communicate the first type communications signal with the first signal source.

38. The WDS of claim 29, wherein the remote DRU is further configured to communicate the second type communications signal with the second signal source.

* * * * *

UNITED STATES PATENT AND TRADEMARK OFFICE
CERTIFICATE OF CORRECTION

PATENT NO. : 10,136,427 B2
APPLICATION NO. : 15/230949
DATED : November 20, 2018
INVENTOR(S) : Dror Harel et al.

Page 1 of 1

It is certified that error appears in the above-identified patent and that said Letters Patent is hereby corrected as shown below:

In the Claims

In Column 20, Line 20, Claim 1, delete "counted" and insert -- coupled --, therefor.

In Column 21, Line 49, Claim 15, delete "PARC;" and insert -- PDRC; --, therefor.

In Column 22, Line 2, Claim 18, delete "PARC" and insert -- PDRC --, therefor.

In Column 22, Line 17, Claim 22, delete "PARC." and insert -- PDRC. --, therefor.

In Column 24, Line 42, Claim 31, delete "Internet" and insert -- internet --, therefor.

In Column 24, Line 44, Claim 32, delete "PARC" and insert -- PDRC --, therefor.

Signed and Sealed this
Tenth Day of December, 2024

Katherine Kelly Vidal
*Director of the United States Patent and Trademark Office*